3,304,277
METAL PRIMER OF AN ACRYLONITRILE COPOLYMER AND A TRIALKYL PHOSPHATE ADDITIVE

Karl-Heinz Mielke, Cologne-Stammheim, Rudolf Wüst, Cologne-Mulheim, and Heinrich Meckbach, Leverkusen, Germany, assignors to Farbenfabriken Bayer Aktiengesellschaft, Leverkusen, Germany, a German corporation
No Drawing. Filed Oct. 20, 1964, Ser. No. 405,240
Claims priority, application Germany, Nov. 14, 1963, F 41,277
4 Claims. (Cl. 260—29.6)

There has been no shortage of attempts to use aqueous plastic dispersions to prime metals for lacquer coatings. Unfortunately, none of these materials has successfully been used in practice since they suffer from a number of disadvantages which prevent their wide use. In general, films prepared from such dispersions, although adequately cohesive when dried in air, are not hard enough to be suitable as primers. Subsequent heat-treatment does not afford any improvement. In contrast, other substances which would provide films of the required hardness after stoving, adhere very poorly to the substrate after drying in air and produce films whose cohesion is inadequate or even non-existent, so that they are not able to withstand even the slightest mechanical stress. These films obviously cannot be stored in this condition, and even subsequent oven-drying does not provide the safety required for the production of a coating which may be used for lacquering purposes.

According to the invention, these disadvantages are obviated by adding to an aqueous dispersion based on an acrylonitrile copolymer from 30 to 120%, by weight, preferably 60 to 90% by weight based on the solids content of the dispersion, a trialkyl phosphate with 1 or 2 carbon atoms in the alkyl group.

It is particularly surprising that the special effects discussed below are clearly limited to the particular phosphoric acid esters mentioned above, and even closely-related similar phosphoric acid esters do not produce comparable results.

Triethyl phosphate has proven particularly suitable. A combination of acrylonitrile polymer dispersions with this ester remains stable for more than a year and produces films of outstanding density which, even after air drying, have an extremely high resistance to scratching and are very hard. They also exhibit outstanding bonding and levelling properties which could not be achieved without the addition of the ester.

An additional property of such a mixture of an acrylonitrile polymer dispersion and triethyl phosphate is that it slowly thickens when heat-treated in a water bath at temperatures of 50 to 80° C., and the viscosity remains stable after cooling. This property may be exploited in order to produce fairly high layer-thicknesses in cases where it is desired to apply only one coat of the lacquer.

When stoved, acrylonitrile-based dispersions of this type are eminently suitable for use as metal primers. The chemical and physical properties of such primers, therefore, depend upon the size of the acrylonitrile fraction. Furthermore, the nature of the comonomers is also of importance.

The amount of acrylonitrile in these dispersions should be higher than that of each of the other comonomers and is preferably from 50 to 75% of the total solids content. Mixture of dispersions may also be employed, and the preferred acrylonitrile content of such mixtures is likewise from 50 to 75%.

The following compounds may in particular be used as comonomers with acrylonitrile: styrene, its substitution products and homologues, in particular styrenes alkylated at the nucleus and side chains, acrylic acid and methacrylic acid, their esters, in particular those with aliphatic or cycloaliphatic monohydric alcohols. Different monohydric alcohols may be employed as alcohol components of the aforementioned esters, for example, linear or branched alcohols with 1 to 12 carbon atoms, such as methyl, ethyl, propyl, isopropyl or, in particular, the butyl alcohols. Apart from these, esters of other alcohols may of course be used.

The following may also be employed as comonomers: alkyl, aryl and aralkyl amides of acrylic or methacrylic acid, vinyl ethers or vinyl esters, for example, vinyl acetate, vinyl propionate and vinyl butyrate. Conjugated diolefines for example, butadiene or isoprene, may of course also be used.

In a preferred embodiment, the acrylonitrile copolymer dispersions that are used comprise (a) 50 to 75 parts by weight of acrylonitrile (b) 10 to 20 parts by weight of an ester of acrylic acid ester with an alcohol containing 1 to 4 carbon atoms or an ester of methacrylic acid ester with an alcohol containing 3 to 5 carbon atoms, and (c) 2 to 15 parts by weight of acrylamide and/or methacrylamide and/or 2 to 10 parts by weight of acrylic and/or methacrylic acid.

The combination of an acrylonitrile copolymer dispersion and triethyl phosphate used as a metal primer may also contain additives known per se, such as anti-aging additives, thinners, pigments, and those which are suitable for inhibiting rust formation and corrosion, in particular the extremely compatible formaldehyde condensation resins of phenols, urea, melamine or their derivatives. These condensation resins are preferably used in the form of precondensates which are soluble, or at least readily dispersible, in weakly alkaline water.

In a special modification of the process, compounds containing reactive groups of the type capable of undergoing additional crosslinking with the copolymer molecules, are also suitable for use as additives. Such substances, briefly referred to a crosslinkers, include, for example, polymers of methylol ethers of acrylamide or methacrylamide, or copolymers of them with other polymerisable compounds. They are expediently used or copolymerised in such quantities that 2 to 10% by weight of the aforementioned methylol ether are present, based on the total amount of monomer.

Processes for the preparation of such polymers containing methylol ether groups are described in Germany Auslegeschrift No. 1,035,363.

Zinc sulphide, titanium dioxide, iron oxides, lead chromate and red lead are suitable for use as pigments. Metal salts of organic or inorganic acids, such as sodium benzoate, sodium nitrate or their mixtures, may be employed as corrosion- or rust-inhibiting additives.

The stoving temperature for these metal primers is from 70° C. to 200° C. It is of no consequence how long the film has been stored in the air-dried condition.

If polymers containing methylol ether groups are used, temperatures below 120° C. down to 70° C. may be employed with advantage, whilst the stoving temperature for polymers without methylol ether groups is expediently in the range of 120° C. to 200° C.

As already mentioned, these primers exhibit an outstanding lack of porosity. A specimen subjected to the so-called salt-spray test (DIN 50907, see also Werkstoff und Korrosion 1955, 325, 1960, pp. 547–551 or Paintindia 11, 1961, 1, pp. 117–119) still had extremely good corrosion-inhibiting properties after 6 weeks in spite of the heavy stressing, whilst with a control specimen, prepared using the phenol-formaldehyde resins currently employed for priming purposes, the film of lacquer was completely destroyed after only 1 week, and the metal surface was completely covered with rust. Similarly, the Kesternich test (DIN 50018) clearly demonstrated the superiority of the described dispersion primer over a conventional primer based on a phenol-formaldehyde resin. The former survived in a satisfactory condition more than 30 of the cycles, laid down in this test, of alternating stressing in the form of moist heat, $SO_2$-atmosphere and distilled water whilst the latter failed completely after only 9 cycles.

If in addition, the film hardness and Erichsen elasticity by the deep-draw test of these two primers are compared the new primers have a pencil hardness of 6-7H, whereas, in the case of the phenolic resin primer has pencil hardness of 3-5H depending upon the curing. Similarly, the Erichsen test showed a satisfactory depth of 7-8 mm., as against 5 mm. for the phenol resin, wherein the film flakes off from the substrate because of inadequate bond strength.

Although a dispersion primer based on an acrylonitrile copolymer with a low acrylonitrile content produces a cohesive film when air-dried, it has also a low film hardness of about HB-H after stoving.

Although a film of the combination according to the invention is not cured when air-dried, the film-forming capacity of a latex-trialkyl phosphate mixture ground with pigments is so outstanding that, when rubbed with a linen cloth or filter paper, a coating dried only in air for 2 to 3 hours does not leave any pigment or binder particles on the cloth or paper.

Even when the coating, dried only in air, is treated for some 10 minutes with hot water, the film remains sealed, and when it is rubbed with a linen cloth, no pigment or binder particles can be removed.

An additional favourable property resulting from the triethyl phosphate in the above combination is that any foaming, which often interferes with the development of the film where dispersion are used, is suppressed.

The parts mentioned in the following examples are parts by weight, unless otherwise indicated.

Example 1

750 cc. of water, 4 g. of potassium persulphate and 5 g. of lauryl sulphate are introduced into a 2-litre reaction vessel equipped with a stirrer. A mixture of 300 g. of acrylonitrile, 175 g. of butyl acrylate and 25 g. of methacrylic acid is then added dropwise over a period of 4 hours at 75 to 77° C. under a nitrogen atmosphere.

At the end of the reaction, stirring is continued for another two hours under nitrogen, and any gases are removed from the mixture which is then filtered through a folded filter.

100 parts of this dispersion with a solids content of 39%, are vigorously stirred with 30 parts of triethyl phosphate. 2 parts of a 20% solution of a mixture of sodium benzoate and sodium nitrite in the ratio 10:1 are then added.

The pH-value is adjusted to 8.5 by means of a 25% ammonia solution.

This mixture is then applied to a metallic support by immersing, spreading or spraying and is stoved for 30 minutes at 180° C. A very elastic primer which bonds well is obtained and may be employed for all conventional cold-setting or thermosetting lacquers based on polyurethanes, epoxide resins, alkyd resins, nitro-combination lacquers or lacquers based on chlorinated rubber.

Example 2

100 parts of a dispersion according to Example 1 are thoroughly mixed with 35 parts of triethyl phosphate and with 2 parts of a 20% solution of a mixture of 10 parts of sodium benzoate and 1 part of sodium nitrite. After the pH-value has been adjusted to 8.5, 50 parts of a pigment mixture consisting of 3 parts of chrome yellow and 1 part of red iron oxide, are stirred in. The mixture is then ground in a cone mill or ball mill or on a roll stand in the manner commonly adopted in the lacquer industry.

This pigmented dispersion is then applied by immersing, spraying or spreading, to a metallic or ceramic support and, after air-drying, is stoved at 150° C. for 45 minutes. A highly elastic and non-porous film is obtained which has outstanding hardness and is suitable as a primer for all kinds of lacquers.

Example 3

100 parts of the dispersion described in Example 1 are mixed, with thorough stirring, with 25 parts of triethyl phosphate and 2 parts of the 20% solution, also described in Example 1, of the mixture of 10 parts of soduim benzoate and 1 part of sodium nitrite.

After the pH-value has been adjusted to 8.5, 8 parts of a 50% aqueous solution of an alkaline-condensed phenolformaldehyde resin are added with stirring.

A lacquer film is prepared from this mixture and stoved for 40 minutes at 160° C. It is highly elastic and exhibits an outstanding corrosion-inhibiting action.

Example 4

A mixture according to Example 3 is stirred and ground with 40 parts of a pigment mixture consisting of three parts of chrome yellow and 1 part of red iron oxide.

A coating of this material hardens when heated at 130° C. for 90 minutes to form a highly elastic, hard and non-porous film.

Example 5

100 parts of a dispersion of a copolymer with a solids content of 38% consisting of 50 parts of acrylonitrile, 45 parts of butyl acrylate and 5 parts of methacrylic acid, which was prepared by the method described in Example 1, are thoroughly stirred with 20 parts of triethyl phosphate and 2 parts of the 20% salt solution also mentioned in Example 1. The pH-value is then adjusted to 8.5 and the mixture combined while stirring, with 10 parts of a 50% aqueous solution of an alkaline-condensed phenol-formaldehyde resin. This mixture is then thoroughly ground with 45 parts of a titanium dioxide pigment, spread on to a metallic support in a layer 30µ thick and stoved for 25 minutes at 180° C.

The resulting film is highly elastic and has outstanding bond strength.

Example 6

0.5 part of lauryl sulphate in 130 parts of water is heated at 80 to 85° C. in a vessel equipped with stirring mechanism and reflex condenser. 8 parts of a 1% aqueous solution of ammonium persulphate are added, followed over a period of 4 to 5 hours, by a mixture of 65 parts of acrylonitrile, 30 parts of styrene and 4 parts of methacrylic acid in the volume ratio 2:1 with a solution of 5 parts of methacrylamide in 53 parts of water, at such a rate that a gentle reflux is continuously maintained in the condenser. The reaction is then allowed to continue for another 2 hours at the aforementioned temperature. 1.5 parts of 1% ammonium persulphate solution are added at regular intervals, e.g. 8 times, throughout the entire reaction period.

At the end of the reaction, the pH-value is adjusted to 7 with dilute $NH_3$-solution and the product is distilled off from any residual, unreacted monomers. It is finally filtered off from any slight deposits after the pH-value has been raised to 8.5 with dilute $NH_3$-solution. If the monomers are completely reacted, with a liquid 38 to 40% latex is obtained. 100 parts of this latex are treated, with thorough stirring, with 40 parts of triethyl phosphate and 2 parts of a 20% solution of a mixture of 10 parts of sodium benzoate and 1 part of sodium nitrite. If necessary, the pH-value is again adjusted to 8.5 with dilute $NH_3$-solution and 6 parts of a 50% aqueous solution of a melamine-formaldehyde resin are added with stirring. 60 parts of finely ground mica powder are then introduced and the entire mixture is ground in a cone mill.

Air-dried coatings on a metal support harden completely in 30 minutes at 160° C., and produce hard, but highly elastic non-porous films which exhibit good corrosion-inhibiting properties.

Example 7

A solution of 1.5 parts of lauryl sulphate in 220 parts of water is heated at 65° C. in a pressure-tight vessel, and a solution of 0.5 part of potassium persulphate in 30 parts of water is added. A monomer mixture of 35 parts of butadiene, 50 parts of acrylonitrile, 10 parts of styrene and 5 parts of methacrylic acid, is introduced under pressure by way of a graduated vessel in 4 to 5 portions, depending on the rate of consumption shown by a rise in the temperature. Polymerisation is complete some two hours after the last addition and the resulting, approximately 30% latex is neutralised with dilute aqueous NH₃ solution.

After any slight deposits have been filtered off and the pH-value adjusted to 8.5, this latex is mixed with the latex described in Example 6 in the ratio 1:1.

35 parts of trimethyl phosphate and 2 parts of a 20% aqueous solution of a mixture of 10 parts of sodium benzoate and 1 part of sodium nitrite, are added while stirring to 100 parts of this latex mixture. 8 parts of an aqueous 50% solution of an alkaline-condensed phenol-formaldehyde resin are then stirred in, and this mixture is ground with 60 parts of red lead. After drying briefly in air, a coating on metal is stoved for 1½ hours at 130 to 140° C. and produces a hard, elastic and non-porous film with a good rust-inhibiting action.

Example 8

100 parts of the dispersion described in Example 1 are mixed with 25 parts of triethyl phosphate and 2 parts of the 20% solution, also described in Example 1, of a mixture of 10 parts of sodium benzoate and 1 part of sodium nitrate. After the pH-value has been adjusted to about 8.5, 12 parts of a 20% aqueous solution of polymethacrylamide methylol methyl ether are added while stirring. A lacquer film with a thickness of 15μ after stoving for 30 minutes at 100° C. has an extremely good resistance to water.

Example 9

35 parts of triethyl phosphate and 2 parts of an aqueous solution of a mixture of 10 parts of sodium benzoate and 1 part of sodium nitrate are added while stirring to 100 parts of the latex mixture used in Example 7. 5 parts of a 20% aqueous solution of polymethacrylamide methylol methyl ether are then stirred in.

A pigment mixture in the form of 23 parts of strontium chromate and 10 parts of red iron oxide with 4 parts of ammonium oxalate as acid former, is ground with the dispersion in a cone mill. A coating 15μ thick on a metallic support is stoved for 60 minutes at 80° C. and produces a scratch-resistant and waterproof film with an excellent corrosion-inhibiting action.

Example 10

30 parts of triethyl phosphate and 2 parts of a 20% solution of a mixture of 10 parts of sodium benzoate and 1 part of sodium nitrite, are added while stirring to 100 parts of the latex mentioned in Example 6. If necessary, the pH-value is again adjusted to 8.5 with dilute NH₃-solution. 13 parts of a 20% aqueous solution of a copolymer of methacrylamide methylol methyl ether and acrylic acid amide in the ratio 1:1 are then added. After stoving for 20 minutes at 130° C. or for 20 minutes at 180° C. a tough elastic film 15μ thick is obtained which has a good corrosion-inhibiting action.

What we claim is:

1. A thermosetting metal primer comprising an aqueous dispersion of (1) a copolymer of acrylonitrile and (2) a member selected from the group consisting of trimethyl phosphate and triethyl phosphate, said copolymer including at least one comonomer selected from the group consisting of styrene, acrylic acid, methacrylic acid, acrylamide, methacrylamide, alkyl esters of acrylic acid and methacrylic acid containing 1–12 carbon atoms in the alkyl moiety thereof, vinyl acetate, vinyl propionate, vinyl butyrate, butadiene and isoprene and at least 50% by weight of said copolymer being copolymerized acrylonitrile.

2. The thermosetting metal primer of claim 1 wherein said aqueous dispersion includes at least one member selected from the group consisting of sodium benzoate and sodium nitrite.

3. The thermosetting metal primer of claim 1 wherein said aqueous dispersion includes a polymer of a monomer selected from the group consisting of the methylol ethers of acrylamide and methacrylamide.

4. The thermosetting metal primer of claim 1 wherein said copolymer consists of 50 to 75 parts by weight of acrylonitrile, 10 to 20 parts by weight of a member selected from the group consisting of alkyl esters of acrylic acid containing 1–4 carbon atoms in said alkyl moiety and alkyl esters of methacrylic acid containing 3–5 carbon atoms in said alkyl moiety and at least one member selected from the group consisting of (a) 2 to 15 parts by weight of at least one monomer of the group consisting of acrylamide and methacrylamide and (b) 2 to 10 parts by weight of at least one monomer of the group consisting of acrylic and methacrylic acids.

References Cited by the Examiner
FOREIGN PATENTS 1,259,320  3/1961  France.
1,266,028  3/1961  France.

MURRAY TILLMAN, *Primary Examiner.*

N. F. OBLON, *Assistant Examiner.*